H. C. ALGER.
FLUID FLOW METER.
APPLICATION FILED AUG. 19, 1912.
1,096,883.
Patented May 19, 1914.
2 SHEETS—SHEET 2.
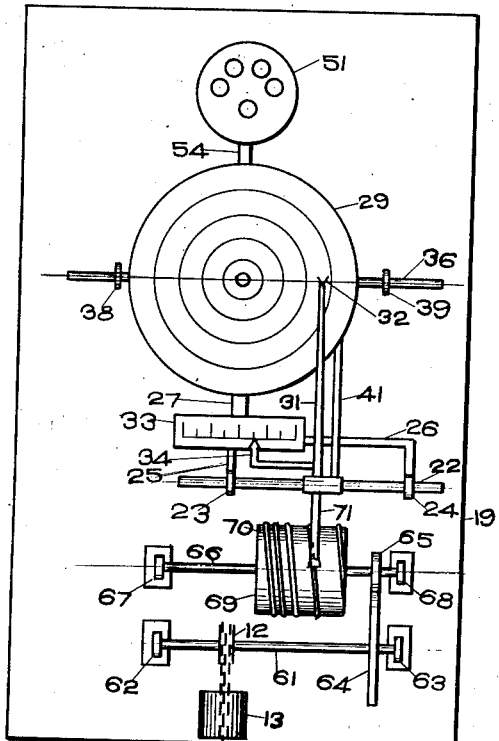
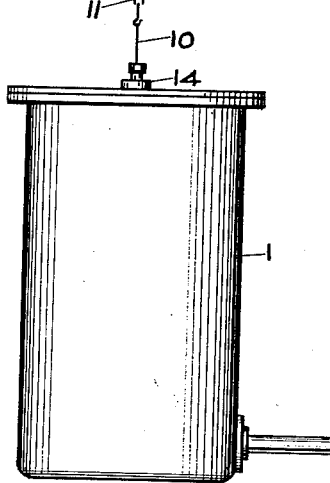
Fig. 3
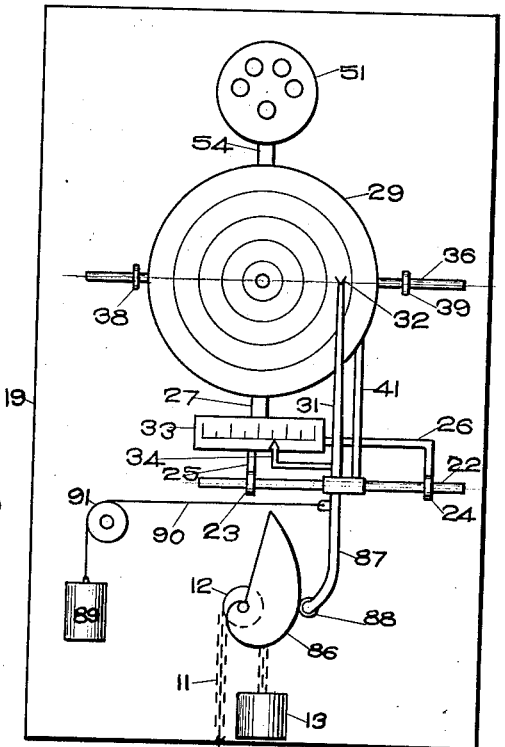
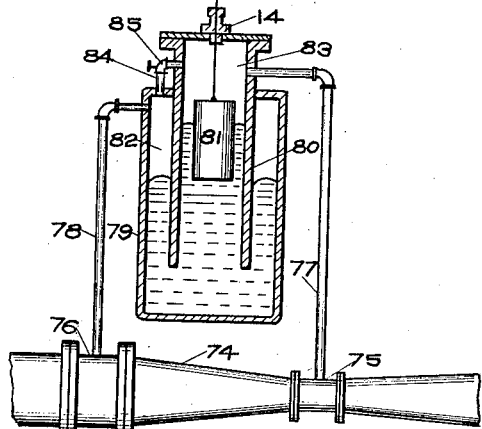
Fig. 4
WITNESSES:
H. Moore.
L. E. Dischinger.
INVENTOR
Harley C. Alger

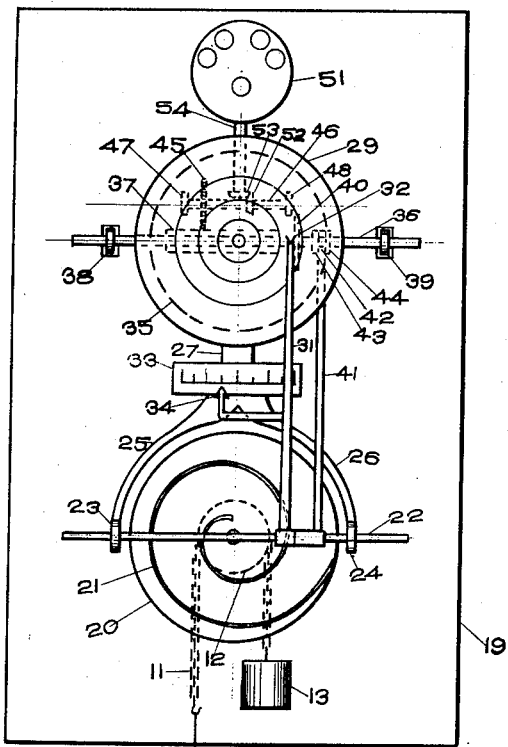

UNITED STATES PATENT OFFICE.

HARLEY C. ALGER, OF CHICAGO HEIGHTS, ILLINOIS.

FLUID-FLOW METER.

1,096,883.  Specification of Letters Patent.  Patented May 19, 1914.

Application filed August 19, 1912. Serial No. 715,898.

*To all whom it may concern:*

Be it known that I, HARLEY C. ALGER, a citizen of the United States, residing at Chicago Heights, in the county of Cook and State of Illinois, have invented new and useful Improvements in Fluid-Flow Meters, of which the following is a specification.

My invention relates to improvements in fluid flow meters wherein a stream of fluid is measured in passing over a weir or V-notch, or through an orifice or Venturi tube or other suitable measuring element by continuously measuring or recording the rates of flow which are proportional to the quantities of fluid passing, one object being to provide such a measuring element with a mechanism which will indicate at all times the rate at which fluid is flowing, which will record these various rates on a suitable chart and which will continuously register the amount of fluid flowing so that the quantity of liquid which has passed through the measuring element at any given time may be known by reading the register.

In the accompanying drawings, Figure 1, is a front, and Fig. 2, a side elevation of my invention as may be applied to measurement of liquid over a weir or V-notch or through an orifice; Fig. 3, shows a modification of my invention, while Fig. 4, shows the application of my invention to the Venturi system of measuring liquids or gases.

Referring particularly to Figs. 1 and 2, a float-pot 1, suitably located, communicates through the pipe, 2, with a weir-box or the supply side of the notch or orifice or an equivalent device adapted for the measurement of liquid, so that the liquid level within the float-pot is at all times the same as the liquid level in the weir-box or such supply side. A float, 3, is positioned within the float-pot so as to be actuated by the level of the liquid therein; rods, 4, 5, and 6, secured to the float are slidingly received within the guides, 7, 8, and 9, respectively, so as to allow free movement of the float in a vertical line. The two rods, 4 and 5, are preferably secured to the float, 3, at a distance apart to prevent turning of the float, 3. The float rod, 6, is connected by means of a wire, 10, or other suitable connection with a chain, 11, which passes over a pulley or sprocket, 12, and which has a weight, 13, suspended from its other end to keep the chain and wire taut. If the space within the float-pot, 1, is under pressure or vacuum the wire, 10, may pass through a suitable stuffing box, 14, which will allow the passage of the wire, 10, therethrough at the same time retaining such pressure or vacuum. The pulley or sprocket, 12, is mounted on a shaft, 15, which is suitably journaled in bearings, 16 and 17, carried by a bracket, 18, secured to a suitable support, 19; a plate or disk, 20, is mounted on the shaft, 15, so as to rotate as the float, 3, rises or falls. Upon the plate, 20, is formed a spirally shaped member, 21, which may be either a groove or slot in the plate or may be formed by a member projecting from the plate. A rod, 22, slidably mounted in guides, 23 and 24, which are suitably supported as by arms, 25 and 26, of the bracket, 27, which is held by the support, 19, carries an arm, 28, having its extending end shaped to engage the spirally shaped member, 21, and is adapted to move the rod, 22, endwise as the spirally shaped member is caused to rotate. A recording surface or member, 29, which may be of the disk or drum type as desired, is preferably marked with circles which may be spaced to represent the rates at which liquid is flowing through the measuring element; a pen arm, 31, which is also carried by the rod, 22, supports a pen, 32, which is adapted to record upon the recording surface, 29. The curvature of the spirally shaped member, 21, and the positions of the circles upon the recording surface, 29, are such that the pen, 32, records the rates at which liquid is flowing through the measuring element. The rate of flow at any instant is represented by the distance from the zero circle to the pen record, measured upon a radial line. It is desirable although not essential that equal radial distances upon the recording surface shall represent equal rates of flow and the curvature of the spirally shaped member may be formed so as to give this desired result. A graduated scale, 33, is suitably located upon the bracket, 27, and a pointer, 34, which may be connected to or operated by the sliding rod, 22, is adapted to indicate upon the scale the rates at which liquid is flowing. The recording member, 29, is secured to a shaft, 34, suitably journaled in bearings, 72 and 73, which may be carried by the bracket, 27; a suitable clockwork, 30, supported from the bracket, 27, or other suitable support, is mounted so as to rotate the shaft, 34, thus causing the recording surface, 29, to move at a uniform rate as time passes. The pen, 32, recording upon the recording surface will then draw a curve which as previously explained, will represent the rates of flow. A suitable radii averaging device may be used to ascertain the average radius of the irregular curve which may be drawn by the recording pen, or to give the average distance from the zero circle of the chart to the curve, which represents the average rate of flow. As the chart also shows the length of time during which this average rate of flow occurs, the total amount of liquid which has passed through the weir or other measuring element may be determined. A friction member, 35, which is preferably constructed in the form of a disk, is mounted on the shaft, 34, driven by the clockwork, 30, so as to move in timed relation with the recording member, 29. A shaft, 36, carrying a gear, 37, with a relatively long face and mounted so as to slide back and forth in the guides 38 and 39, carried by brackets, secured to the support, 19, as shown at, 49, Fig. 2, carries a friction wheel, 40, which is adapted to receive motion from the friction member, 35; an arm, 41, secured to the sliding rod, 22, and carrying a fork or yoke, 42, at its opposite end is received between two collars, 43 and 44, which are secured to the shaft, 36. The yoke, 42, allows the shaft, 36, to revolve freely but moves it sidewise and preferably radially to the recording member, 29, as the sliding rod, 22, is moved. A gear, 45, mounted upon a shaft, 46, suitably journaled in bearings, 47 and 48, carried by brackets secured to the support, 19, as shown at 50, Fig. 2, meshes with the gear, 37, with relatively long face upon the shaft, 36. The shaft, 36, may then move end-wise while at the same time revolving and will revolve the shaft, 46, at all times in relation to the rate at which the friction wheel, 40, revolves. As the motion of the recording member, 29, or friction member, 35, which are driven by clockwork is uniform, as equal distances measured on radial lines with recording member represent equal rates of flow, and as the friction wheel moves endwise with respect to the shaft it will revolve more rapidly when near the outside of the friction member than when near the center and will at all times revolve at rates proportional to the rates at which liquid is flowing through the measuring element. A register, 51, operated from the shaft, 46, is adapted to register the amount of fluid and to show at all times the quantity of fluid which has passed through the measuring element. The shaft, 46, operates through suitable mechanism such as a pair of bevel gears, 52 and 53, operating the shaft, 54, suitably supported by bearings, 55 and 56; the shaft, 54, in turn operates a second pair of gears, 57 and 58, operating the shaft, 59, of the register, 51. The register, 51, may be held by a bracket, 60, carried by the support, 19; a flexible shaft may be used in place of the bevel gear drive, if desired.

Fig. 3, shows a mechanism which may be used for operating the sliding rod, 22. The pulley or sprocket, 12, is mounted upon a shaft, 61, suitably mounted in bearings, 62 and 63, held by the support, 19. The shaft, 61, carries a gear, 64, which meshes with the gear, 65, secured to the shaft, 66, suitably journaled in bearings, 67 and 68, carried by the support, 19. The shaft, 66, carries a drum, 69, upon which may be wound a wire, 70, which may be formed in the shape of a distorted helix. An arm, 71, carried by the sliding rod, 22, has its extending end suitably shaped to engage the wire, 70, which is thus adapted to transmit motion to the sliding rod, 22, carrying the pen, 32, adapted to record upon the recording member, 29. The shape of the helically wound wire is such that the pen, 32, records at all times on the recording member, 29, the rates at which liquid is flowing.

Fig. 4, shows the device adapted for use with the Venturi system of measuring fluids. A Venturi tube, 74, having a throat, 75, of smaller diameter than the diameter of the main pipe line and diverging from the throat, 75, to the original size of the pipe line at the point, 76, has pipe connections, 77 and 78, at the throat, 75, and the point, 76, which connect to two sides of a suitably arranged manometer, which may consist of a casing, 79, having a centrally located cylinder, 80, extending to a point near the bottom of the casing, 79, the interior of the casing and cylinder being filled with mercury. A float, 81, connected to a wire, 10, is adapted to rise and fall as the mercury within the central cylinder rises and falls. The pipe leading from the point, 76, of the Venturi tube may connect to the annular space, 82, formed between the central cylinder, 80, and the casing, 79, while the pipe leading from the throat, 75, of the Venturi tube may connect with the space, 83, within the central cylinder, 80. The difference in head at the throat, 75, and the point, 76, of the Venturi tube caused by the fact that the velocity head is so much greater at the throat, 75, than at the point, 76, causes the mercury to rise and fall within the central cylinder, 80. The wire, 10, passes through a suitable stuffing box, 14, which may retain any pressure within the manometer. An equalizing pipe, 84, having a valve, 85, is adapted to equalize the pressure within the annular space, 82, and the space, 83, for the purpose of obtaining a zero level of the mercury and for adjusting the relation of the float, 81, with the mechanism above. The wire, 10, extending through the stuffing box, 14, may be secured to the chain, 11, which passes over the pulley or sprocket, 12, having the weight, 13, at its opposite end. The pulley or sprocket, 12, may be made to operate a cam, 86, causing the cam to turn as the float rises or falls. An arm, 87, carrying a roller, 88, which is adapted to operate upon the working surface of the cam, 86, is connected to the sliding rod, 22, so that the sliding rod, 22, is moved as the cam turns and the shape of the cam, 86, may be such that the pen, 32, will record the correct rates of flow on the recording member, 29, as previously described. The cam, 86, may operate the arm, 87, in one direction while a weight, 89, operating through a cord, 90, over a pulley, 91, may tend to operate the sliding rod, 22, in the opposite direction so as to hold the roller, 88, against the working surface of the cam at all times.

It is evident that variations may be made in the proportions of the various parts and that the shape of the various elements may be altered without departing from the scope of my invention. For example, the recording member may be made of the disk shape as shown or it may be made in the form of a drum or cylinder with a recording surface located upon such cylinder.

I do not confine myself to the particular constructions set forth.

What I claim as my invention and desire to protect by Letters Patent is:

1. In a fluid flow recorder, a recording surface and a friction member mounted on a shaft, means for rotating the shaft, means for recording upon the recording surface, an integrating register and means driven by the friction member and controlled by the recording means to cause the register to operate.

2. In a fluid flow recorder, a recording surface, a friction member, means for rotating the recording surface and friction member, means for recording upon the recording surface, an integrating register and means driven by the friction member and controlled by the recording means to cause the register to operate.

3. In a fluid flow recorder, a shaft, a recording surface and a friction member carried by such shaft, means for recording upon the recording surface, an integrating registering member and means actuated by the friction member to cause the operation of the registering member.

4. In a fluid flow recorder, a recording surface, means for recording thereon, a friction member, a wheel adapted to receive motion therefrom, an integrating register, means for transmitting motion from the wheel to drive the register and a sliding member adapted to operate the recording means and to control the position of the wheel with respect to the friction member.

5. In a fluid flow recorder, a recording surface, means for recording thereon, an integrating register, a friction member, a wheel adapted to receive motion from the friction member to operate the register, said wheel being mounted upon a sliding shaft and adapted to move with respect to the friction member and a sliding member adapted to operate the recording means and to operate the sliding shaft.

6. In a fluid flow recorder, a recording surface and a friction member mounted on a shaft, means for rotating the shaft, means for recording upon the recording surface, a scale, means for indicating thereon, a register, a wheel driven by said friction member and adapted to move axially to operate the register and a sliding member adapted to operate the recording means, the indicating means and the driven wheel.

7. In a fluid flow recorder, a recording surface, means for recording thereon, a register, a friction member, a wheel driven by said friction member for operating the register, said wheel being mounted upon a sliding shaft and adapted to move with respect to the friction member and a sliding member mounted so as to slide in a direction substantially parallel to the sliding shaft and adapted to operate the recording means and the sliding shaft.

8. In a mechanism of the class described, a recording surface, a friction member, means for rotating the recording surface and friction member, a register, a sliding shaft, a friction wheel mounted thereon and adapted to receive motion from the friction member to drive the register, a plate mounted so as to rotate in accordance with the flow of fluid, a spirally shaped member on said plate, a rod slidably mounted parallel to the sliding member and adapted to receive motion from the spirally shaped member as said plate rotates, means operated by the sliding rod for recording upon the recording surface and means connecting the sliding shaft with the sliding rod whereby the relative position of the friction wheel and friction member is changed.

9. In a mechanism of the class described, a recording surface, a friction member, means for rotating the recording surface and friction member, a register, a sliding shaft, a friction wheel mounted thereon and adapted to receive motion from the friction member to drive the register, a plate mounted so as to rotate in accordance with the flow of fluid, a spirally shaped member on said plate, a rod slidably mounted parallel to the sliding member and adapted to receive motion from the spirally shaped member as said plate rotates, a scale, means for indicating thereon, means for recording upon the recording surface, means operatively connecting the indicating means and recording means with the sliding rod and means connecting the sliding shaft with the sliding rod whereby the relative position of the friction wheel and friction member is changed.

10. In a mechanism of the class described, a plate adapted to rotate in accordance with the flow of fluid, a spirally shaped member on said plate, a recording surface, a friction member, means for rotating the recording surface and friction member, a rod slidably mounted and adapted to receive motion from the spirally shaped member as said plate rotates, means operated by the rod for recording upon the recording surface, a register, a gear rotatably mounted, means driven by the gear and adapted to drive the register, a sliding shaft, a friction wheel thereon adapted to receive motion from the friction member, a gear with relatively long face mounted on the shaft and meshing with said gear as the shaft slides and means connecting the sliding shaft with the sliding rod to cause the shaft to slide longitudinally as the rod moves, whereby the relative position of the friction wheel and the friction member is changed.

11. In a mechanism of the class described, a plate adapted to rotate in accordance with the flow of fluid, a spirally shaped member on said plate, a recording surface, a friction member, means for rotating the recording surface and friction member, a rod slidably mounted and adapted to receive motion from the spirally shaped member as said plate rotates, a scale, means for indicating thereon, means operated by the rod for recording upon the recording surface, means operatively connecting the indicating means and recording means, a register, a gear rotatably mounted, means driven by the gear and adapted to drive the register, a sliding shaft, a friction wheel thereon adapted to receive motion from the friction member, a gear with relatively long face mounted on the shaft and meshing with said gear as the shaft slides and means connecting the sliding shaft with the sliding rod to cause the shaft to slide longitudinally as the rod moves, whereby the relative position of the friction wheel and the friction member is changed.

12. In a mechanism of the class described, a recording surface and a friction member mounted on a shaft, means for rotating the recording surface and friction member, a register, a sliding shaft, a friction wheel mounted on the shaft in contact with the friction member whereby the wheel and shaft are rotated, a gear secured to the shaft and adapted to rotate with the shaft, a second gear meshing with the first mentioned gear, one of the gears to have a relatively long face whereby the gears remain in mesh as the sliding shaft slides, means driven by the second gear to operate the register, a sliding rod, means for moving the sliding rod in accordance with the flow of fluid, means operated by the rod to record upon the recording surface and means connecting the sliding shaft with the rod whereby the relative position of the friction wheel and friction member is changed.

HARLEY C. ALGER.

Witnesses:
   VIVA LEE MOREN,
   W. N. CROSS.